(12) United States Patent
Miller

(10) Patent No.: US 10,540,801 B1
(45) Date of Patent: Jan. 21, 2020

(54) METHOD AND SYSTEM FOR CONSTRUCTION PROJECT MANAGEMENT USING PHOTO IMAGING MEASUREMENTS

(71) Applicant: William Ernest Miller, Union City, NJ (US)

(72) Inventor: William Ernest Miller, Union City, NJ (US)

( * ) Notice: Subject to any disclaimer, the term of this patent is extended or adjusted under 35 U.S.C. 154(b) by 1184 days.

(21) Appl. No.: 14/625,790

(22) Filed: Feb. 19, 2015

Related U.S. Application Data

(60) Provisional application No. 61/942,162, filed on Feb. 20, 2014.

(51) Int. Cl.

| | | |
|---|---|---|
| *G06T 15/00* | (2011.01) | |
| *G06Q 10/06* | (2012.01) | |
| *G06K 9/00* | (2006.01) | |
| *G06T 11/60* | (2006.01) | |
| *G06F 16/58* | (2019.01) | |
| *G06F 16/53* | (2019.01) | |
| *G06F 16/50* | (2019.01) | |
| *G06F 16/56* | (2019.01) | |
| *H04L 29/06* | (2006.01) | |
| *G06Q 30/06* | (2012.01) | |
| *G06F 21/36* | (2013.01) | |
| *G06F 3/0481* | (2013.01) | |
| *G06T 17/20* | (2006.01) | |
| *H04N 13/275* | (2018.01) | |
| *H04N 1/00* | (2006.01) | |

(52) U.S. Cl.
CPC ........ *G06T 15/005* (2013.01); *G06F 3/04815* (2013.01); *G06F 16/50* (2019.01); *G06F 16/53* (2019.01); *G06F 16/56* (2019.01); *G06F 16/58* (2019.01); *G06F 21/36* (2013.01); *G06K 9/00671* (2013.01); *G06Q 10/06313* (2013.01); *G06Q 30/0621* (2013.01); *G06Q 30/0643* (2013.01); *G06T 11/60* (2013.01); *G06T 17/20* (2013.01); *H04L 29/06* (2013.01); *G06T 2207/10004* (2013.01); *G06T 2207/20221* (2013.01); *H04N 1/00204* (2013.01); *H04N 13/275* (2018.05); *H04N 2201/0081* (2013.01)

(58) Field of Classification Search
None
See application file for complete search history.

(56) References Cited

U.S. PATENT DOCUMENTS

| | | | |
|---|---|---|---|
| 7,409,392 B2 | 8/2008 | Greer et al. | |
| 7,835,934 B2 | 11/2010 | Gunderson et al. | |
| 9,081,917 B2 * | 7/2015 | Currin | G06Q 50/06 |
| 9,336,629 B2 * | 5/2016 | Finn | G01C 15/002 |
| 9,489,103 B2 * | 11/2016 | Brier | G06F 3/0481 |
| 10,078,320 B2 * | 9/2018 | Rivers | B23Q 9/0042 |
| 10,282,600 B2 * | 5/2019 | Curlander | G06K 9/00355 |

(Continued)

*Primary Examiner* — Gurkanwaljit Singh
(74) *Attorney, Agent, or Firm* — Hoffman Warnick LLC

(57) ABSTRACT

The present invention is a method and system of small construction project management by way of photo imaging and measurement capture for use by do-it-yourselfers, handymen and small contractors. The method and system operates on mobile computing devices and includes an image recognition system. By performing various imaging based measurements and then processing the resultant data, the method and system produces bills of materials, invoices, and receipts for the necessary tools and materials required by a construction project.

4 Claims, 7 Drawing Sheets

(56) References Cited

U.S. PATENT DOCUMENTS

| | | |
|---|---|---|
| 2002/0198755 A1 | 12/2002 | Birkner et al. |
| 2003/0050871 A1 | 3/2003 | Broughton |
| 2005/0195216 A1* | 9/2005 | Kramer .................. G06F 3/14 345/619 |
| 2006/0015475 A1 | 1/2006 | Birkner et al. |
| 2006/0203261 A1* | 9/2006 | Kacker ................ G06T 7/0002 358/1.6 |
| 2007/0226258 A1* | 9/2007 | Lambdin ........... G02B 23/2469 |
| 2010/0191611 A1 | 7/2010 | Biro |
| 2010/0198652 A1 | 8/2010 | Spanton, Jr. et al. |
| 2011/0037764 A1 | 2/2011 | Saleem |
| 2011/0043652 A1* | 2/2011 | King .................. G06F 17/2211 348/222.1 |
| 2011/0096174 A1* | 4/2011 | King ...................... G06F 21/31 348/207.1 |
| 2013/0061189 A1* | 3/2013 | Brier ..................... G06F 3/0481 716/102 |
| 2013/0061198 A1* | 3/2013 | Brier ..................... G06F 3/0481 716/139 |
| 2013/0132440 A1 | 5/2013 | Carlson et al. |
| 2013/0138606 A1 | 5/2013 | Kahle et al. |
| 2014/0095133 A1* | 4/2014 | Silva ..................... G06Q 10/04 703/7 |
| 2014/0210947 A1* | 7/2014 | Finn ..................... G01C 15/002 348/46 |
| 2014/0258428 A1* | 9/2014 | Agarwal ................ G06Q 10/10 709/206 |
| 2014/0368373 A1* | 12/2014 | Crain ....................... G01S 5/02 342/5 |
| 2014/0368378 A1* | 12/2014 | Crain ....................... G01S 5/02 342/25 A |
| 2015/0112647 A1* | 4/2015 | Currin .................... G06Q 50/06 703/1 |
| 2015/0120389 A1* | 4/2015 | Zhang ................... G06Q 10/10 705/7.32 |
| 2015/0121196 A1* | 4/2015 | Ye ....................... G06F 3/04845 715/234 |
| 2015/0186965 A1* | 7/2015 | Paul ..................... G06F 16/381 705/26.41 |
| 2015/0379623 A1* | 12/2015 | Gadre ................ G06Q 30/0643 705/27.2 |
| 2016/0042402 A1* | 2/2016 | Gadre ................ G06Q 30/0269 705/14.66 |
| 2016/0063588 A1* | 3/2016 | Gadre ................ G06Q 30/0623 705/26.61 |
| 2016/0210738 A1* | 7/2016 | Curlander ................ G06K 9/78 |
| 2016/0226308 A1* | 8/2016 | Valin ........................ H02J 7/355 |
| 2016/0300293 A1* | 10/2016 | Nagar ................ G06Q 30/0643 |

* cited by examiner

METHOD AND SYSTEM FOR CONSTRUCTION PROJECT MANAGEMENT USING PHOTO IMAGING MEASUREMENTS

CROSS-REFERENCE TO RELATED APPLICATION(S)

The present application claims the benefit of U.S. provisional application No. 61/942,162, filed on Feb. 20, 2014, the entire disclosure of which is incorporated by reference as if set forth in its entirety herein.

FIELD OF INVENTION

The present invention relates to a method and system for photo imaging and measurement, and more particularly, to a comprehensive small construction project management system.

BACKGROUND

Do-it-yourselfers, handymen and small contractors are frequently involved with small construction projects that require various raw tools and materials that need to be obtained for the projects. The purchasing process for these raw tools and materials may frequently require various precise measurements and calculations to determine the correct bill of materials, which includes the correct list of tools, and a determination of the required quantities of materials.

There is a need by do-it-yourselfers, handymen and small contractors for a photo imaging and measurement system operating on various computing devices, both mobile and desktop, that includes an an imaging recognition system. The photo imaging and measurement system should allow users to scan and input various data related to construction projects. The system when manipulated would then produce lists of required tools and materials based on the construction project data.

The present invention is a method and system of photo imaging and measurement for use by do-it-yourselfers, handymen and small construction contractors. By performing various imaging based measurements and then processing the resultant data, the method and system produces lists of tools and materials needed to complete project bills of materials, invoices, and receipts. The present invention accomplishes these objectives.

SUMMARY

A photo imaging and measurement Application (PIM-P Application) operates on a Computing Device. In some embodiments of the invention, the Computing Device may be a Mobile, Desktop, Laptop, or other CPU device. The Computing Device may comprise an iPhone, iPad, Android phone, Blackberry, Personal Computer, etc., but is not limited to these exclusive examples. In one embodiment of the invention, the PIM-P Application may be utilized in either offline mode or online mode.

In offline mode, login to and execution of the PIM-P Application occurs on the computing device. Once the Application is accessed, the default status of the system is "offline." If the choice is made to remain offline, the Application prompts to perform "limited" system calibration local to the mobile/desktop computing device. In offline mode, images, measurements and data may be collected and stored locally on the Computing Device, but cannot be fully processed until the system status enters online mode and the various system servers are accessed.

If the choice is made to go "online," connection to the internet is made through a Main Web Server which receives and directs data and processing requests to the various system servers and relational data bases. The PIM-P Application is now able to access and integrate with the various system servers and the functional software capabilities, which are the remote Software as a Service (SaaS) platform.

System calibration SaaS processing occurs in the "online" mode, when required data is collected on the Computing Device and relayed to the System Calibration Server via the Main Web Server. Data received and processed by the System Calibration Server is then stored in the System Calibrate RDB according to the calibration process used: either Frame of Reference; Point of Reference; or 3D Scan.

System processes and calculations (SaaS processing) occur in the "online" mode, when required data is collected on the Computing Device and relayed to the System Processes Server via the Main Web Server. Project Name, Photo Image, and Dimension measurements are processed by the System Processes Server, and then stored along with Project Guide URLs and Tools and Materials in the Project Information RDB.

On completing the initial processing of Project Information above, the system notifies the PIM-P Application locally on the Computing Device to select a Project Guide. Selecting a Project Guide link from the displayed list, accesses the Vendor eCommerce Site, via the Main Web Server and the Retail Vendor Web Server in order to view the Project Guide "How To" video. At this point, the Retail Vendor eCommerce Site remains visibly open and accessible to the user while other system processes are carried out by the other remote SaaS functions.

The selected Project Guide data and a system prompt to calculate tools and materials quantities are sent via the Main Web Server to the System Processes Server. Based on the Project Guide video selected, the System Processes Server retrieves the project Dimensions and the recommended Tools and Materials from the Project Information RDB to calculate required project Tools and Materials quantities lists. The Required Tools list prompts the System Process Server to access the Preferred Tool Vendor Web Server and Tool Sku RDB via the Main Web Server to retrieve and display in the Preferred Tool Vendor tools matching the Required Tools list, in the Application on the Computing Device. Required Tools and Materials are now selected for purchase on the Retail Vendor eCommerce Site in standard "Shopping Cart" and "Checkout" format.

Other features and advantages of the present invention will become apparent from the following more detailed description, taken in conjunction with the accompanying drawings, which illustrate, by way of example, the principles of the invention. Both the foregoing general description and the following detailed description are explanatory only and are not restrictive of the non-limiting embodiments as claimed.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

Exemplary embodiments of the present inventions are depicted in the various drawing figures. Embodiments may be implemented in many different forms and should not be construed as limited to the embodiments described here. Rather, these embodiments are described so that this disclosure will be thorough and complete, and will fully convey the scope of the embodiments to those skilled in the art.

Figure 1:
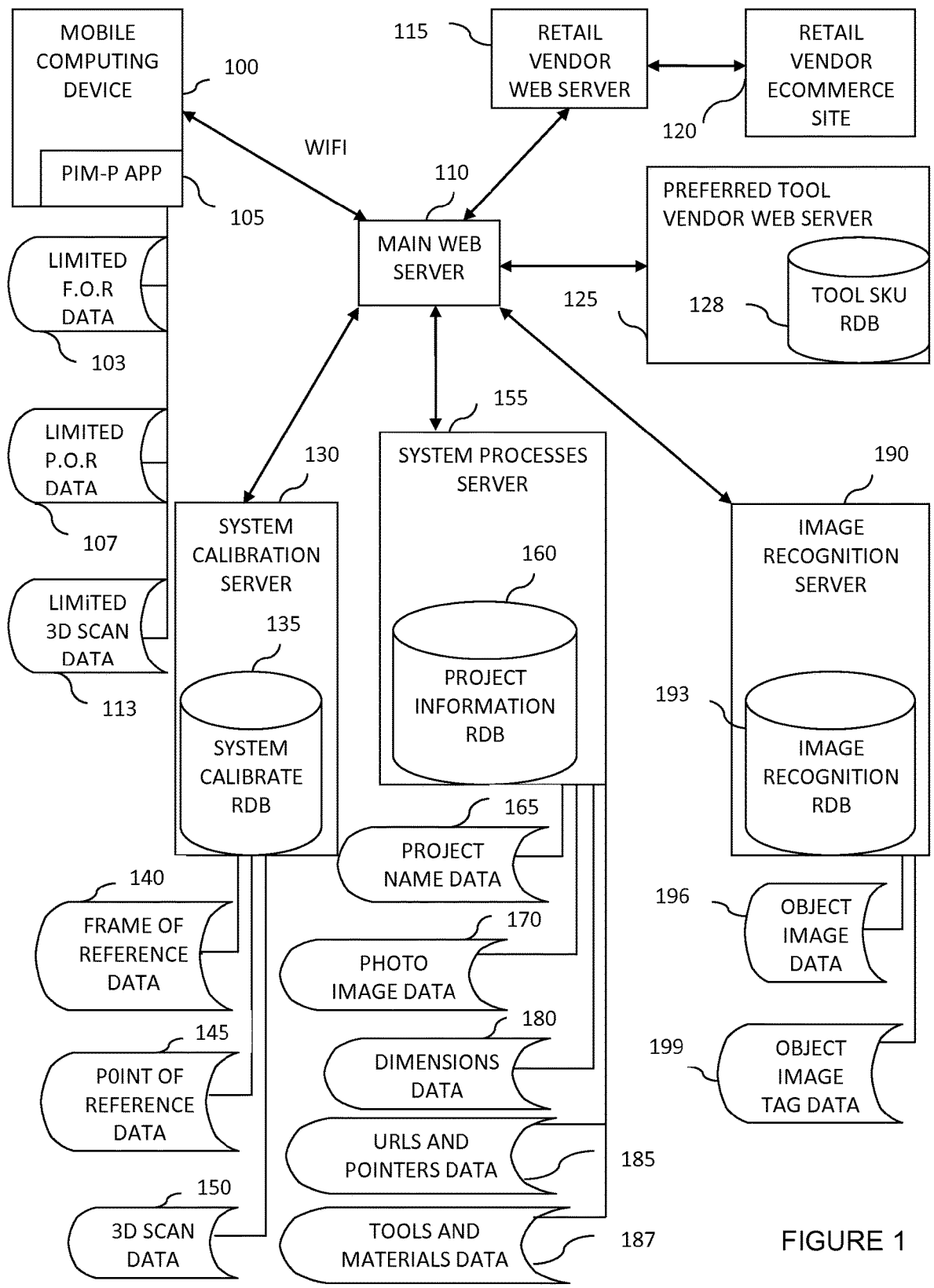
FIG. 1 is a system diagram depicting the system hardware, software and interfaces in accordance with an embodiment of the present invention.

FIG. 1 is a diagram depicting the system hardware and software in accordance with an embodiment of the present invention. A photo imaging and measurement Application 105 (PIM-P Application) operates on a Computing Device 100 which may be a Mobile, Desktop, Laptop, or other CPU device. The Computing Device 100 may comprise an iPhone, iPad, Android phone, Blackberry, Personal Computer, etc., but is not limited to these exclusive examples. The Computing Device 100 communicates with various networked servers via a wireless or hard-wired network interface.

The PIM-P Application 105 may be utilized in either offline mode or online mode. In offline mode, login to and execution of the PIM-P Application 105 occurs on the Computing Device 100. Once the Application 105 is accessed, the default status of the system is "offline." If the choice is made to remain offline, the Application 105 prompts to perform "limited" system calibration local to the mobile/desktop computing device 100, thus producing Limited Frame of Reference Data 103; Limited Point of Reference Data 107; Limited 3D Scan Data 113. In offline mode, images, measurements and data may be collected and stored locally on the Computing Device 100, but cannot be fully processed until the system status enters online mode and the various system servers are accessed. If needed, information stored on the Computing Device 100 may be exported to other computing devices including standard desktop/laptop computing devices in standard file formats including but not limited to .jpg, .xls, .doc, .ppt, .csv, .pdf etc., once the system status is "online."

In online mode login to and execution of the PIM-P Application 105 occurs on the Computing Device 100. Once the PIM-P Application 105 is accessed, the default status of the system is "offline." If the choice is made to go "online," connection to the internet is made through a Main Web Server 110 which receives and directs data and processing requests to the various system servers (130, 155, 190) and relational data bases (135, 160, 193). The PIM-P Application 105, local to the Computing Device 100, is now able to access and integrate with the various system servers (130, 155, 190) and the functional software capabilities. The Application 105 executes on the mobile device, while the remote system servers (130, 155, 190) function as a Software as a Service (SaaS) platform. Once the system status is online, any previously collected and stored calibration data, images, measurements etc. local to the Computing Device 100 will be automatically processed by the appropriate server and joined in the corresponding RDB.

System calibration SaaS processing occurs in the "online" mode, when required data is collected on the Computing Device 100 and relayed to the System Calibration Server 130 via the Main Web Server 110. Data received and processed by the System Calibration Server 130 is then stored in the System Calibrate RDB 135 according to the calibration process used: either Frame of Reference 140; Point of Reference 145; or 3D Scan 150.

System processes and calculations (SaaS processing) occur in the "online" mode, when required data is collected on the Computing Device 100 and relayed to the System Processes Server 155 via the Main Web Server 110. Project Name 165, Photo Image 170 and Dimension measurements 180 are processed by the System Processes Server 155 and then stored along with Project Guide URLs 185 and Tools and Materials 187 in the Project Information RDB 160.

On completing the initial processing of Project Information above, the system notifies the PIM-P Application 105 locally on the Computing Device 100 to select a Project Guide. The System Processes Server 155 points to the URLs 185 in the Project Information RDB 160 and displays in the PIM-P Application 105 on the Computing Device 100, the list of Project Guide "How To" video links that correspond to the Project Name Data 165 and Photo Image Data 170. Selecting a Project Guide link from the displayed list accesses the Vendor eCommerce Site 120, via the Main Web Server 110 and the Retail Vendor Web Server 115 in order to view the Project Guide video. At this point, the Retail Vendor eCommerce Site 120 remains visibly open and accessible to the user while other system processes are carried out by the other remote SaaS functions.

A Project Guide "How To" video is selected and confirmed in the Application 105, for processing use. The selection of a Project Guide video prompts the system to calculate tools and materials quantities. The prompt is sent via the Main Web Server 110 to the System Processes Server 155. Based on the Project Guide video selected, the System Processes Server 155 retrieves the project Dimensions 180 and the recommended Tools and Materials 187 from the Project Information RDB 160 to calculate required project Tools and Materials 187 quantity lists. The Required Tools 187 list prompts the System Process Server 160 to access the Preferred Tool Vendor Web Server 125 and Tool SKU RDB 128 via the Main Web Server 110 to retrieve and display in the Preferred Tool Vendor products matching the Required Tools 187 list, in the Application 105 on the Computing Device 100.

Required Tools and Materials are now selected for purchase on the Retail Vendor eCommerce Site 120 in standard "Shopping Cart" and "Checkout" format.

Image Recognition SaaS processing occurs in the "online" mode, when required image and tag data are collected on the Computing Device 100 and relayed to the Image Recognition Server 190 via the Main Web Server 110. An Object Image 196 and Object Image Tag 199 are processed by the Image Recognition Server 155 and Image Recognition software then joined in the Image Recognition RDB 193.

Figure 2A:
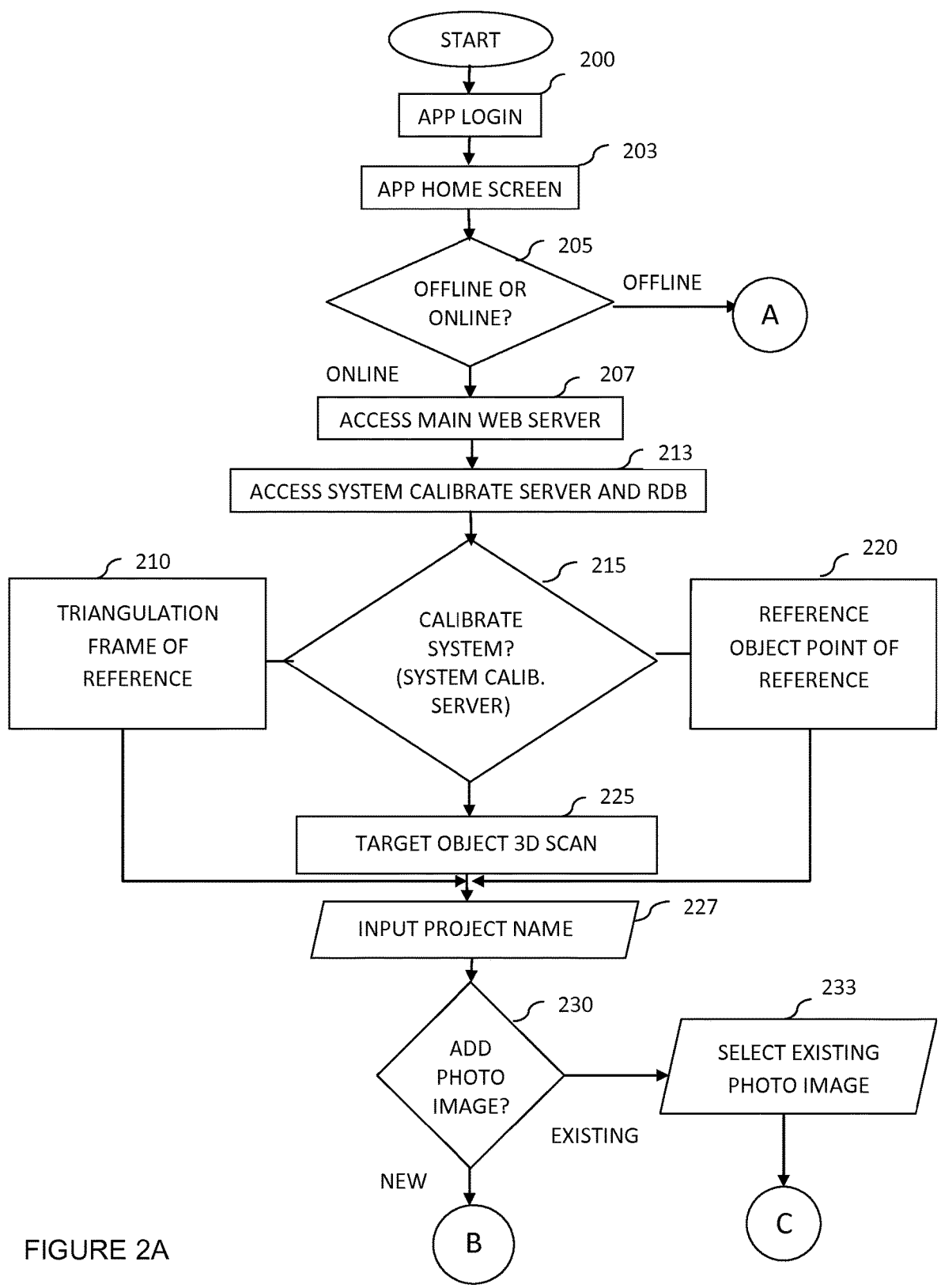
FIG. 2A is a flowchart of a photo imaging and measurement application in accordance with an embodiment of the present invention.

FIG. 2A illustrates a flowchart of the photo imaging and measurement application. In step 200, the user logs in with user name and password to the PIM-P user interface application 105 executing on the Computing Device 100. In step 203, after user login, the PIM-P application 105 Home screen appears.

In step 205, the Home screen presents the option to Go Online (Yes or No). Default is off-line. If Online is selected, processing continues at step 207. If Offline is selected, processing continues at connector A. At step 207, the Main Web Server 110 is accessed. In step 213, The Main Web Server 110 (FIG. 1), automatically passes control to the System Calibration Server 130 (FIG. 1) and System Calibrate RDB 135 (FIG. 1) to perform one or more selected System Calibration procedure(s) (210, 220, 225). In some embodiments, the User may choose one System Calibration procedure (210, 220, 225). In other embodiments, the User may utilize a combination of System Calibration procedures (210, 220, 225). At step 215, the User chooses the system calibration procedure(s) (210, 220, 225).

In step 210, the System Calibration Server 130 performs System Calibration by Triangulation Frame of Reference 210. In step 220, the System Calibration Server 130 performs System Calibration by Reference Object Point of Reference 220. In step 225, the System Calibration Server 130 performs System Calibration by Target Object 3D Scan 225.

In step 227, on completion of System Calibration, the Application 105 returns to the PIM-P Application 105 Home screen to input the Project Name. Saving the Project Name sends information top the System Processes Server 155 (FIG. 1) and Project Information RDB 160 (FIG. 1). In step 230, on completion of Project Name, a photo image of the project is then added by either Capture New Photo Image 240 (FIG. 2B) or else Select Existing Photo Image 233.

Figure 2B:
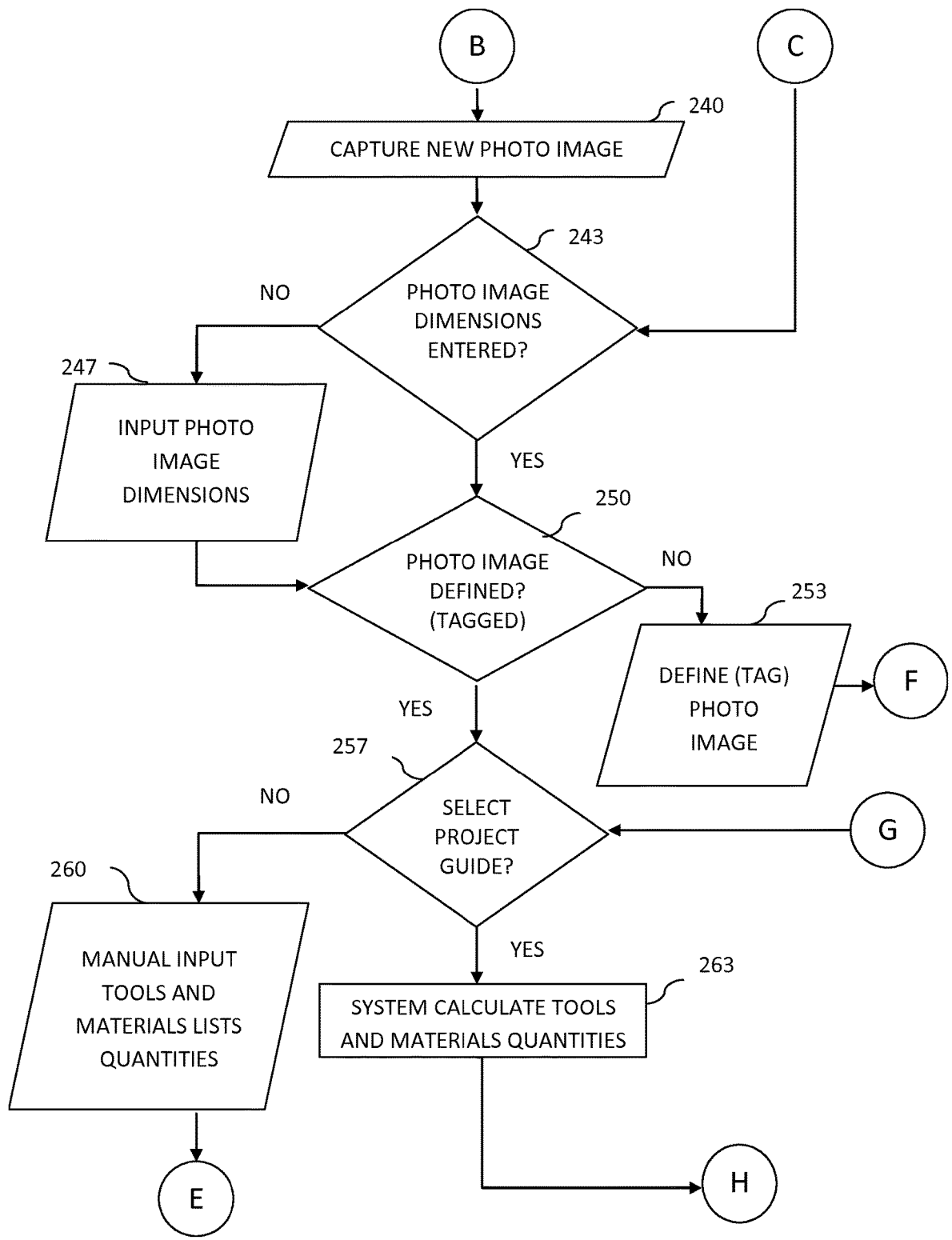
FIG. 2B is a flowchart of a photo imaging and measurement application in accordance with an embodiment of the present invention.

Referring to FIG. 2B, in step 240, a new photo image is captured and saved, and processing continues at step 243. A photo image may be captured by various devices including but not limited to a camera device intrinsic to the System Mobile Device 100, another mobile device such as a cellular phone or a computing tablet, a camera device independent of the disclosed system hardware, or a scanning device which is independent of the disclosed system hardware. The photo image may be transferred to the system Mobile Computing Device 100 by multiple methods including but not limited to; standard wireless or wired Internet connectivity, standard device-to-device direct wireless or hardwired connectivity. The new photo image is saved to the System Processes Server 155 (FIG. 1) and Project Information RDB 160 (FIG. 1).

In step 233, an existing photo image is selected. If Select Existing Photo is chosen, the photo may be selected from a local file on the mobile computing device, or selected from the System Processes Server 155 (FIG. 1) and Project Information RDB 160 (FIG. 1). Processing now continues at step 243 (FIG. 2B).

In FIG. 2B, (step 243), once a photo image is selected, the Application 105 determines if the Photo Image Dimensions are entered. If the Photo Image Dimensions are entered, then the Application continues at step 250. If the Photo Image Dimensions are not entered, the Application 105 proceeds to step 247. In step 247, Photo Image Dimensions are inputted by selecting a dimension to be measured from a User Interface, then touching a display and "drawing" the length of the dimension being measured. The user may perform multiple touches around the perimeter of a hole or curved object, and then connect the touch points by drawing between them. This will identify to the system that the object being measured is other than a straight line. Completing and saving the image dimensions sends the information to the System Processes Server 155 (FIG. 1) and Project Information RDB 160 (FIG. 1).

In step 250, after completing dimensions capture, from the Home screen, the image will be defined. If Photo Image is defined, the Application 105 proceeds to step 257. If Photo Image is not defined, the Application proceeds to step 253. In step 253, Define Photo Image means something like "hole" for a hole in a wall or "P-trap" for the plumbing trap under a sink. This Photo Image definition also tags the image for use by the Image Recognition Server 190 (FIG. 1) and Image Recognition RDB 193 (FIG. 1). The defined photo is saved as Photo Image Data 170 in the Project Information RDB 160 (FIG. 1). Once the Photo Image has been defined, the Application 105 proceeds through connector F. Saving the image definition sends the information to the Image Recognition Server 190 (FIG. 1) and the Image Recognition RDB 193 (FIG. 1) via connector F as well as the System Processes Server 155 (FIG. 1) and Project Information RDB 160 (FIG. 1).

In step 257, the User is prompted to select a Project Guide "How To" video. A Project Guide "How To" video is maintained on the Retail Vendor eCommerce Site 120 and portrays methods, tools and materials to be utilized for completing the project, in the video being viewed for selection. In step 257, the user is prompted to select a Project Guide. At this time, the combination of the Project Name Data 165 and Photo Image data 170 points the system to the appropriate Project Guide URL links 185 (FIG. 1) in the Project Information RDB which when displayed and selected on the Mobile Computing Device 100, then accesses the retail vendor's "How To" videos via the Main Web Server, 110 (FIG. 1), the Retail Vendor Web Server 155 (FIG. 1) and the Retail Vendor eCommerce Site 120 (FIG. 1). If a Project guide is selected, the Application 105 proceeds to step 263 and continues at connector H. If no Project Guide is selected, the Application 105 proceeds to step 260.

Selecting a Project Guide "How To" video from the Retail Vendor eCommerce Site prompts the System Processes Server 155 (FIG. 1) to Calculate Tools and Materials Quantities 263. The Application 105 then proceeds through connector H. In step 260, no Project Guide has been selected. Based on calculations external to the system, anticipated tools and material quantities are manually entered and saved to the system. Saving this information sends it to the System Process Server 155 (FIG. 1) and the Project Information RDB 160 (FIG. 1).

Figure 2C:
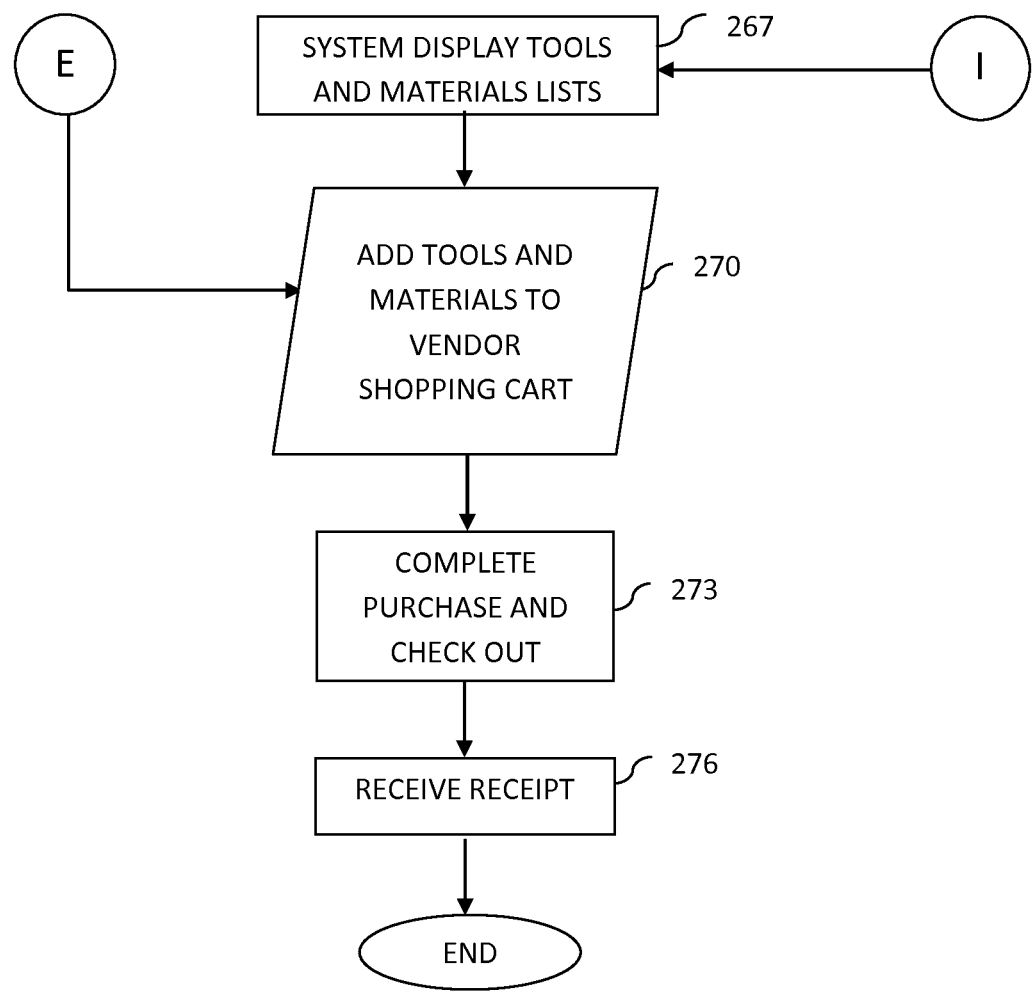
FIG. 2C is a flowchart of a photo imaging and measurement application in accordance with an embodiment of the present invention.

Referring to FIG. 2C, the Application enters step 267 from connector I, or else it enters step 270 from connector E. In step 267, the Application 105 displays system-calculated materials and preferred tools lists. In step 270, using the system-calculated materials and tools requirements or the manually entered tools and materials list, the System Process Server 155 (FIG. 1) directs the Main Web Server 110 (FIG. 1) to the Retail Vendor Web Server 115 (FIG. 1) and Retail Vendor eCommerce Site 120 (FIG. 1). Tools and materials are selected and added to the Shopping Cart 270 and Checked Out 273, on the Retail Vendor eCommerce site 120 (FIG. 1). The purchase is completed using an appropriately aligned Vendor Credit account or an independent Credit Card. The project is then saved on the Mobile Computing Device 100, and Project Information Server 160. In step 276, an electronic receipt is transmitted from the Vendor eCommerce site 120. The Application 105 main system process now ends. The Application 105 main system process now ends.

Figure 3:
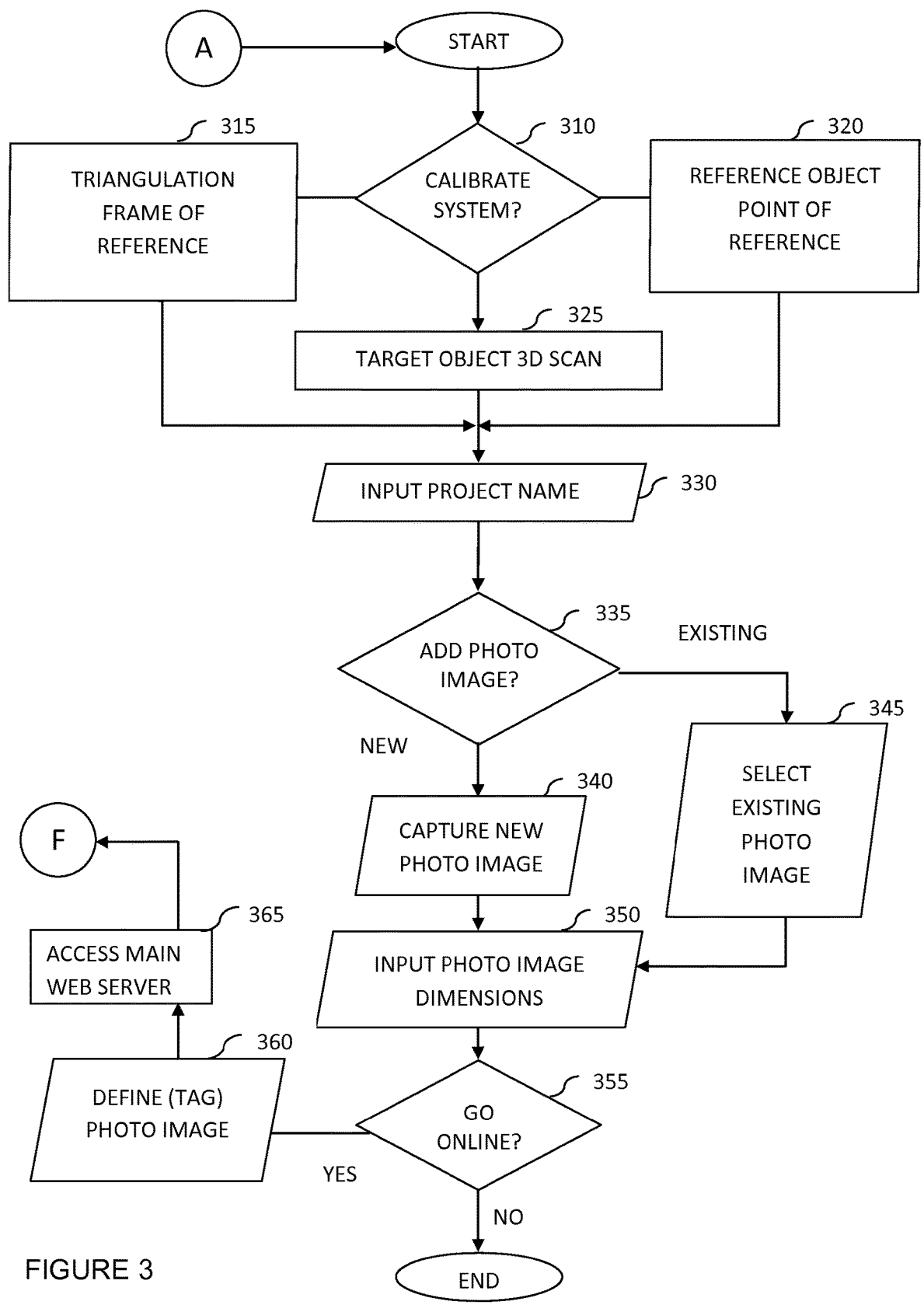
FIG. 3 is a flowchart of a photo imaging and measurement application in accordance with an embodiment of the present invention.

Referring to FIG. 3, the Application 105 flow enters from connector A while in Off-line mode. In step 310, while Off-line, the PIM-P Application 105 provides limited calibration capability, local to the Computing Device 100 (steps 315, 320, 325). At step 310, the User chooses one or more system calibration procedures (steps 315, 320, 325). In step 315, the Application 105 performs limited System Calibration by Triangulation Frame of Reference 103 (FIG. 1). In step 320, the Application 105 performs limited System Calibration by Point of Reference object 107 (FIG. 1). In step 325, the Application 105 performs limited System Calibration by Target Object 3D Scan. 113 (FIG. 1). In step 330, on completion of limited System Calibration, the Application 105 returns to the Application 105 home screen (FIG. 1) to input a Project Name.

In step 335, on completion of Project Name input (step 330), a photo image of the project is then added from a limited source file on the Computing Device 100. The User may select an existing image (step 345) or else capture a new photo image (step 340). In step 340, the User captures a new photo image. A photo image may be captured by, but not limited to; a camera device which is intrinsic to the System Mobile Device 100 or other mobile device such as a cellular phone or computing tablet; a camera device which is independent of described system hardware or a scanning device which is independent of described system hardware. The photo image may be transferred to the system Mobile Computing Device 100 by way of but not limited to; standard wireless or hardwire internet connectivity; standard device-to-device direct wireless or hardwired connectivity. The Application 105 then proceeds to step 350. In step 345, the User selects an existing photo image. If Select Existing Photo is chosen, the photo may be selected from a local file on the Computing Device 100 only. The Application 105 proceeds to step 350. In step 350, the User inputs Photo Image Dimensions by selecting the dimension to be measured from a user interface, then touching a Computing Device 100 screen and "drawing" the length of the dimension being measured. The User may first touch multiple points around the perimeter of a hole or curved object, then connect the touch points by drawing between them. This will identify to the system that the object being measured is other than a straight line. These dimensions will be saved locally on the Computing Device 100 until the Computing Device 100 is connected online to the System Processes Server 155 (FIG. 1) and Project Information Database 160 (FIG. 1).

In step 355, the User is prompted to Go Online. If "no" is answered, then the operation ends, project information is saved locally, and the Application 105 returns to the Home screen. If "yes" is answered, the Application proceeds to step 360. In step 360, Define Photo Image is a forced command. This means that no further processing will occur online until the project image has been defined as outlined previously in step 253.

Figure 4:
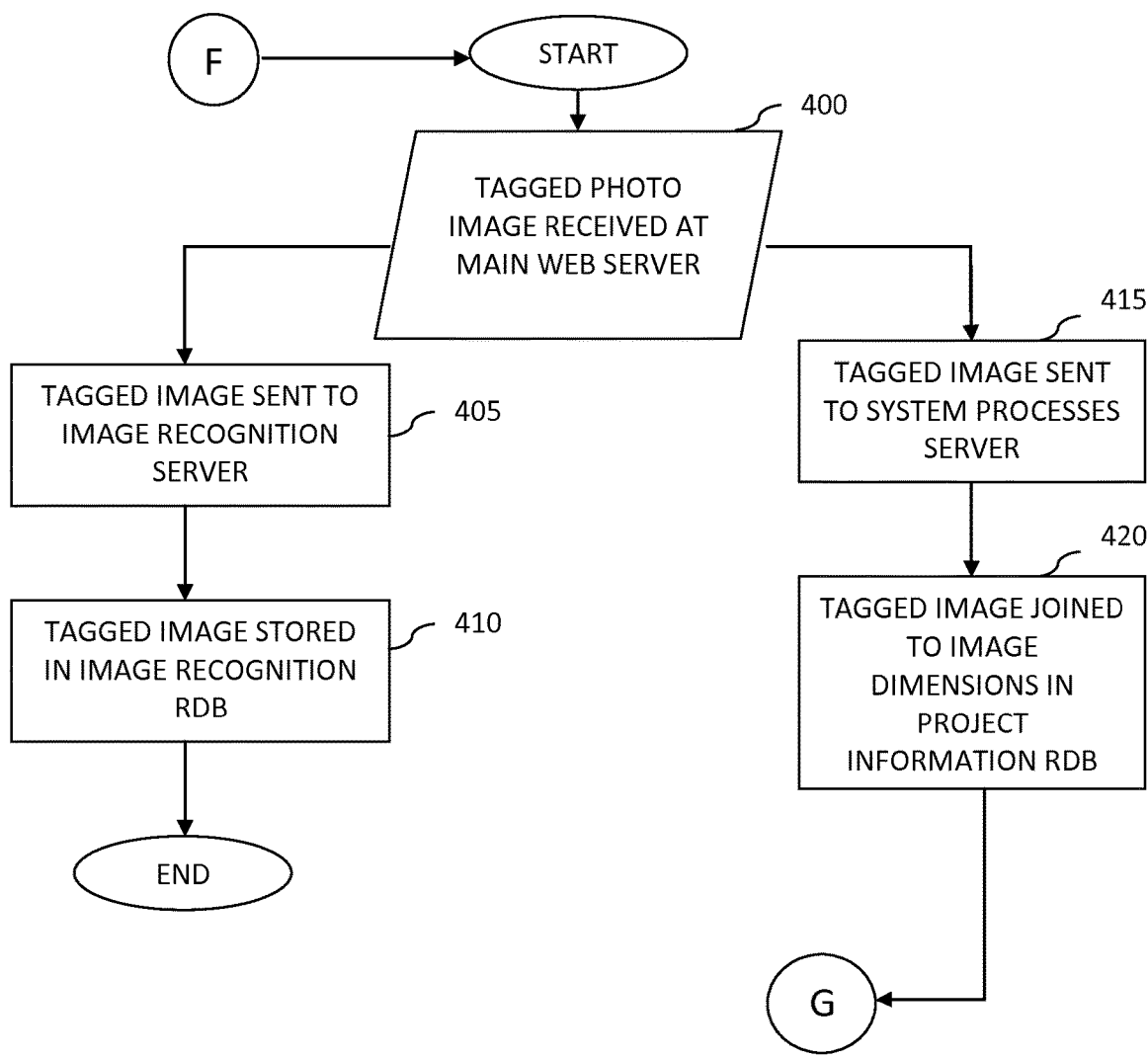
FIG. 4 is a flowchart of a photo imaging and measurement application in accordance with an embodiment of the present invention.

In step 365, once an image is defined Sub-process A (FIG. 3) completes. The Main Web Server is now accessed and enters Sub-process F (FIG. 4). Sub-process F accesses both the Image Recognition Server 190 (FIG. 1) and the Image Recognition RDB 193 (FIG. 1) as well as the System Processes Server 155 (FIG. 1) and Project Information RDB 160 (FIG. 1).

Referring to FIG. 4, step 400 may be entered from either step 253 (FIG. 2B) or else from step 365 (FIG. 3, Sub-process A). The defined (tagged) Photo Image is received at the Main Web Server 110 (FIG. 1). The Main Web Server identifies the tagged Photo Image data (196, 199), and forwards it to the Image Recognition Server 190 (FIG. 1) and the Image Recognition RDB 193 (FIG. 1) for processing and storage by Image Recognition software (steps 405, 410). The Main Web Server also forwards the tagged Photo Image to the System Processes Server 155 (FIG. 1) for project processing (steps 415, 420). Image dimensional calculations are stored with other related project data in the Project Information RDB 160 (FIG. 1).

In step 405, the tagged Photo Image is identified and processed by Image Recognition software. The tagged Photo Image is then stored in the Image Recognition RDB 193 (step 410). This builds the Image Recognition RDB 193 for future improvement and "smart" system functionality via Image Recognition software capabilities.

In step 415 the tagged Photo Image is sent to the System Processes Server 155 (FIG. 1) where name, definition and dimensional details are processed and stored for further calculation. In step 420, the tagged Photo Image is stored and joined with Project details in the Project Information RDB 160, including Name Data 165, Image Data 170, and Dimensions Data 180 (FIG. 1). Once the System Processes Server 155 image processing is complete, Sub-process A completes and exits from connector G and enters the main system flow from connector G at step 257 (FIG. 2B).

Figure 5:
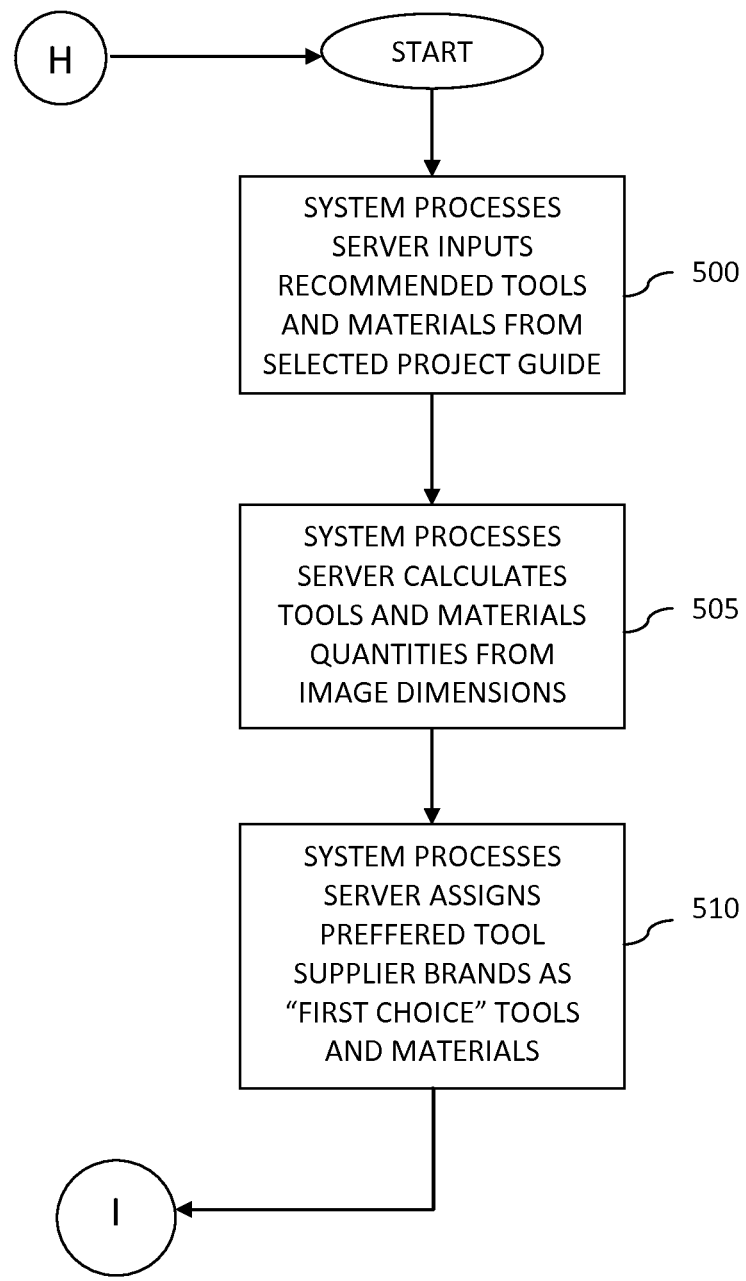
FIG. 5 is a depiction of a photo imaging and measurement application in accordance with an embodiment of the present invention.

Referring to FIG. 5, the Application 105 enters from connector H into step 500. In step 500 the System Processes Server 155 (FIG. 1) retrieves recommended tools and materials posted in the selected Project Guide video. In step 505 the System Processes Server 155 (FIG. 1) retrieves project Dimensions Data 180 from the Project Information RDB 160 (FIG. 1) and calculates anticipated tools and materials quantities based on selected Project Guide recommendations and actual project measurements. In step 510, based on a recommended tools list, the System Processes Server 155 (FIG. 1) accesses the Preferred Tool Vendor Web Server 125 (FIG. 1) and the Tool SKU RDB 128 (FIG. 1) to retrieve and list Preferred Tool Vendor products matching recommended items. When Sub-process H is complete, it re-enters the main system through connector I at step 267 (FIG. 2C).

Embodiments of the invention may be practiced as methods, systems or devices. Accordingly, embodiments may assume the form of a hardware implementation, a firmware implementation, an entirely software implementation or an implementation combining software, firmware and hardware aspects. The detailed description here is, therefore, not to be taken in a limiting sense.

Unless specifically stated otherwise here, it is intended that throughout the description, terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. General-purpose systems may be used with programs in accordance with the disclosure here, or more specialized apparatus may be utilized to perform the required method steps.

In addition, the present invention is not described with reference to any particular programming language. It will be appreciated that a variety of programming languages may be used to implement the teachings of the present invention as described herein, and any references to specific languages are provided for disclosure of enablement and best mode of the present invention.

Embodiments of the present disclosure are described here with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality or procedures involved. Additionally, not all of the blocks shown in any flowchart need to be performed and/or executed. For example, if a given flowchart has five blocks containing functions or procedures, it may be the case that only three of the five blocks are performed and/or executed. In this example, any of the three of the five blocks may be performed and/or executed.

The mobile or desktop computing device 100 may include a WIFI or wired network interface. The Computing Device 100 may consist of any of a variety of electronic devices including but not limited to mobile telephones, cellular telephones; PDA's equipped with communication capabilities, and mobile computers or palm computers and desktop personal computers with various wireless or wired communication capabilities. The desktop Computing Device 100 may be comprised of any of the standard devices available including but not limited to devices which support the Apple, Microsoft, or Android operating systems with interfaces to the Internet. In addition to supporting the functionality of the present invention, the Computing Device 100 may also provide common mobile communication functions such as placing telephone calls, email and texting.

While embodiments of the invention have been described in detail above, the invention is not limited to those specific variations. The ascribed invention descriptions should be considered as merely exemplary illustrations set forth for a clear understanding of the principles of the invention. Further variations, modifications, extensions, or equivalents of the invention may be developed without departing from the scope of the invention. It is therefore intended that the invention not be limited to the particular embodiments disclosed as the best mode contemplated for carrying out this invention, but that the invention will include all the embodiments falling within the scope of the appended claims.

What is claimed is:

1. A system, comprising:
   a computing device having a processor and a camera;
   a downloadable project management application for managing a construction project, including:
   a system for creating a new project and providing a project name;
   a system for calibrating the camera to ascertain a relative size and perspective of a field of view, wherein in the system for calibrating includes allowing the user to choose one or more of a triangulation frame of reference process, a point of reference process and a target object 3D scan process;
   a display interface for capturing and displaying a photo image from the camera;
   a system for calculating dimensions of an object in the photo image, including selecting a dimension to be measured from a user interface and measuring the dimension while the photo image is being displayed in the display interface based on a user drawn line, wherein the user drawn line is generated in response to a user touching the display interface;
   a system for defining the photo image with a tag and saving the photo image and tag as photo image data, wherein the photo image data is stored in an image recognition database;
   a server interface for uploading the project name, the photo image data and the dimension to a server;
   a system for receiving and displaying a list of project guides and for selecting a project guide, wherein the list of project guides are determined based on the project name and the photo image data;
   an interface for viewing required tools and materials for a selected project guide, wherein the required tools and materials are based on the selected project guide and the dimensions; and
   a system for linking to a vendor eCommerce web server for purchasing required tools and materials.

2. The system of claim 1, wherein the system for calculating a dimension utilizes a process that allows a user to:
   touch multiple points of a curved object; and
   draw a line on the curved object by connecting each of the points.

3. The system of claim 1, wherein each of the project guides includes a "how to" video.

4. A method for obtaining project guides and tools and materials for a project using a computing device having a processor and a camera, comprising:
   providing a downloadable project management application for managing a construction project, including:
   creating a new project and providing a project name;
   calibrating the camera to ascertain a relative size and perspective of a field of view, wherein in the calibrating includes one or more of a triangulation frame of reference process, a point of reference process and a target object 3D scan process;
   capturing and displaying a photo image from the camera via a display interface;
   calculating dimensions of an object in the photo image, including selecting a dimension to be measured from a user interface and measuring the dimension while the photo image is being displayed in the display interface with a user drawn line, wherein the user drawn line is generated in response to a user touching the display interface;

defining the photo image with a tag and saving the photo image and tag as photo image data, wherein the photo image data is stored in an image recognition database;

uploading the project name, the photo image data and the dimension to a server;

receiving and displaying a list of project guides, wherein the list of project guides are determined based on the project name and the photo image data;

receiving and displaying required tools and materials for a selected project guide, wherein the required tools and materials are based on the selected project guide and the dimensions; and displaying a link to a vendor eCommerce web server for purchasing required tools and materials.

\* \* \* \* \*